(12) United States Patent
Mizutani et al.

(10) Patent No.: US 10,027,197 B2
(45) Date of Patent: Jul. 17, 2018

(54) STATOR FOR ROTARY ELECTRIC MACHINE

(71) Applicant: TOYOTA JIDOSHA KABUSHIKI KAISHA, Toyota-shi, Aichi-ken (JP)

(72) Inventors: Tetsushi Mizutani, Nagoya (JP); Yuichiro Ito, Anjo (JP); Keiichi Kaneshige, Seto (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 447 days.

(21) Appl. No.: 14/818,876

(22) Filed: Aug. 5, 2015

(65) Prior Publication Data

US 2016/0043605 A1    Feb. 11, 2016

(30) Foreign Application Priority Data

Aug. 8, 2014   (JP) ................. 2014-162100

(51) Int. Cl.
| | |
|---|---|
| *H02K 15/12* | (2006.01) |
| *H02K 3/48* | (2006.01) |
| *H02K 1/16* | (2006.01) |
| *H02K 3/12* | (2006.01) |
| *H02K 3/30* | (2006.01) |
| *H02K 3/38* | (2006.01) |

(52) U.S. Cl.
CPC .............. *H02K 3/48* (2013.01); *H02K 1/16* (2013.01); *H02K 3/12* (2013.01); *H02K 3/30* (2013.01); *H02K 3/38* (2013.01); *H02K 2203/12* (2013.01)

(58) Field of Classification Search
CPC .. H02K 3/48; H02K 1/16; H02K 3/12; H02K 3/30; H02K 3/38; H02K 2203/12

USPC ............................................. 310/45
See application file for complete search history.

(56) References Cited

U.S. PATENT DOCUMENTS

| | | | |
|---|---|---|---|
| 6,268,678 B1 | 7/2001 | Asao et al. | |
| 6,429,557 B2 * | 8/2002 | Sheeran ............... | H02K 3/50 310/270 |
| 6,849,982 B2 * | 2/2005 | Haydock .............. | H02K 3/46 310/156.32 |

(Continued)

FOREIGN PATENT DOCUMENTS

| | | |
|---|---|---|
| JP | 2003143791 A | 5/2003 |
| JP | 2007312549 A | 11/2007 |

(Continued)

OTHER PUBLICATIONS

Communication, dated Jun. 17, 2016, from the European Patent Office in counterpart European application No. 15179769.3.

*Primary Examiner* — Jianchun Qin
(74) *Attorney, Agent, or Firm* — Sughrue Mion, PLLC

(57) ABSTRACT

A stator includes a stator core, a stator attachment and a plurality of segment coils. The stator core has a yoke portion, stator teeth and stator slots. The stator attachment is placed on an axial end surface of the stator core. The stator attachment includes attachment teeth, attachment slots and varnish guide faces. Each of the attachment slots communicates with an axial open end of each of the stator slots. The varnish guide faces approach an axially central side toward an attachment slot side in the radial direction. The segment coils are fixed to the stator core with varnish. Each segment coils includes plurality of conductor segments. The conductor segment is bent by making contact with the attachment teeth.

6 Claims, 13 Drawing Sheets

(56) References Cited

U.S. PATENT DOCUMENTS 9,130,439 B2 * 9/2015 Murphy ............ H02K 15/0037

FOREIGN PATENT DOCUMENTS

| JP | 2008-109732 | A | 5/2008 |
| JP | 2011-200050 | A | 10/2011 |
| JP | 2012-244800 | A | 12/2012 |
| JP | 2014-007836 | A | 1/2014 |
| WO | 2014/020755 | A1 | 2/2014 |

* cited by examiner

STATOR FOR ROTARY ELECTRIC MACHINE

INCORPORATION BY REFERENCE

The disclosure of Japanese Patent Application No. 2014-162100 filed on Aug. 8, 2014 including the specification, drawings and abstract is incorporated herein by reference in its entirety.

BACKGROUND OF THE INVENTION

1. Field of the Invention

The present invention relates to a rotary electric machine stator including a stator attachment placed on an axial end surface of a stator core.

2. Description of Related Art

Japanese Patent Application Publication No. 2008-109732 (JP 2008-109732 A) describes such a configuration that varnish is dropped from above a stator core provided with a stator coil in a state where that coil end of the stator coil which is on one side in an axial direction is placed on an upper side. In this configuration, the stator coil is impregnated with the varnish, so that the stator coil is fixed to the stator core.

Japanese Patent Application Publication No. 2012-244800 (JP 2012-244800 A) describes that a plurality of conductor segments is connected so as to form a segment coil as a stator coil. JP 2012-244800 A also describes that a movable cuff support is placed on an axial end surface of a stator core at the time of manufacturing a stator, so as to regulate, by the cuff support, bending positions of the conductor segments inserted into slots of the stator core.

In the stator including the segment coil like JP 2012-244800 A, when varnish is dropped from above the stator core like JP 2008-109732 A, the varnish might flow out toward a radially outside from an upper end of the stator core through an upper side of a yoke portion of the stator core. As a result, the varnish may hardly be able to be supplied to that part of the segment coil which is close to the stator core, e.g., that part of the segment coil which is inside the slots of the stator core. In view of this, there is room for improvement in terms of increasing reliability of a connecting and fixing portion between the segment coil and the stator core. Further, in a case where the conductor segments are formed in a bending manner by use of the movable cuff support like JP 2012-244800 A, a moving mechanism of the cuff support is required, which complicates a manufacturing apparatus for the stator.

SUMMARY OF THE INVENTION

The present invention provides a rotary electric machine stator which can simplify a stator manufacturing apparatus and which can increase reliability of a connecting and fixing portion between a segment coil and a stator core.

A stator related to the present invention is for a rotary electric machine. The stator includes a stator core, a stator attachment and a plurality of segment coils. The stator core has a yoke portion, stator teeth and stator slots. The yoke portion has a circular shape. The stator teeth projects in a radial direction from an inner peripheral surface of the yoke portion. Each stator slots is defined between adjacent stator teeth. The stator attachment is placed on an axial end surface of the stator core. The stator attachment includes an outer annular portion, attachment teeth, an inner annular portion, attachment slots and varnish guide faces. The outer annular portion is placed on the yoke portion. The attachment teeth are connected to the outer annular portion and placed on the stator teeth. The inner annular portion is connected to radial inner ends of the attachment teeth. Each attachment slots is defined by the outer annular portion, the inner annular portion, and adjacent attachment teeth. Each of the attachment slots communicates with an axial open end of each of the stator slots. The varnish guide faces are provided on the outer annular portion or the inner annular portion. The varnish guide faces approach an axially central side toward an attachment slot side in the radial direction. The segment coil is wound around the stator teeth. The segment coil is fixed to the stator core with varnish. Each segment coil includes a plurality of conductor segments. The plurality of conductor segments are bent and connected to each other outside an axial end of the stator core. The conductor segments are bent by making contact with the attachment teeth.

According to the rotary electric machine stator of the present invention, it is possible to simplify a stator manufacturing apparatus and to increase reliability of a connecting and fixing portion between a segment coil and a stator core.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the present invention is described below in detail with reference to the drawings. A shape, a material, a number, and the like to be described below are exemplifications for descriptions and can be changed appropriately according to specifications of a rotary electric machine stator. In the following description, the same reference sign is assigned to a similar constituent. Note that the rotary electric machine stator constitutes a rotary electric machine in combination with a rotor fixed to a rotating shaft. The rotary electric machine is used as a motor or a generator, or a motor generator having functions of both the motor and the generator.

Figure 1:
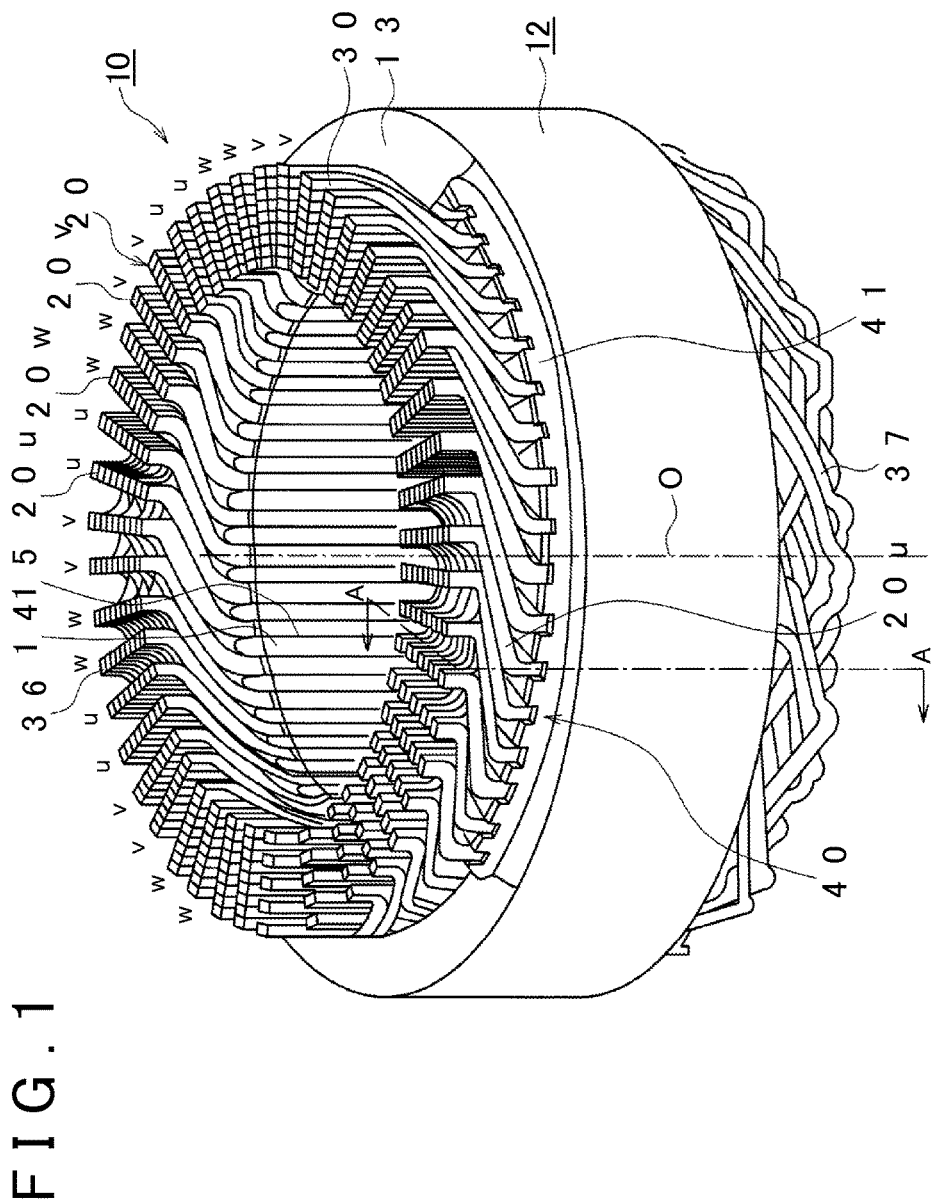
FIG. 1 is a perspective view illustrating a rotary electric machine stator according to an embodiment of the present invention with some parts of the rotary electric machine stator being omitted.
Figure 2:
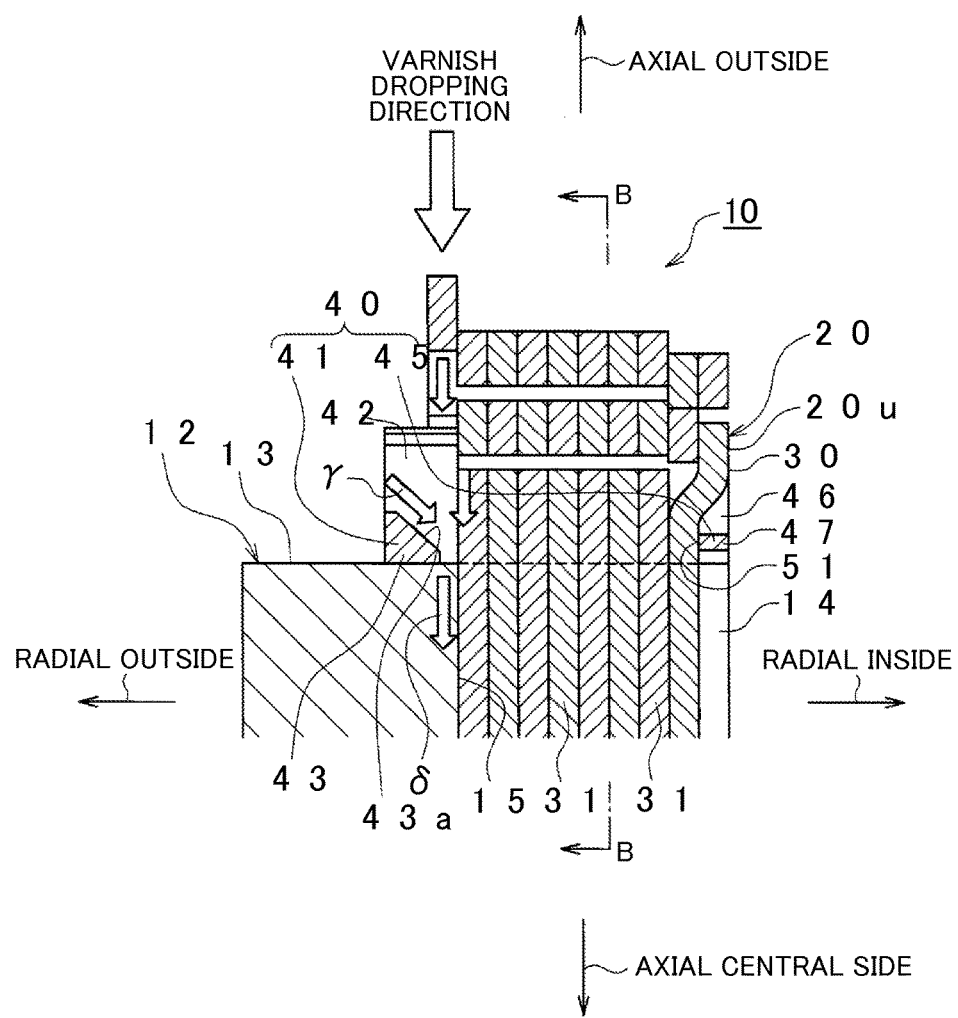
FIG. 2 is a sectional view taken along a line A-A in FIG. 1.
Figure 3:
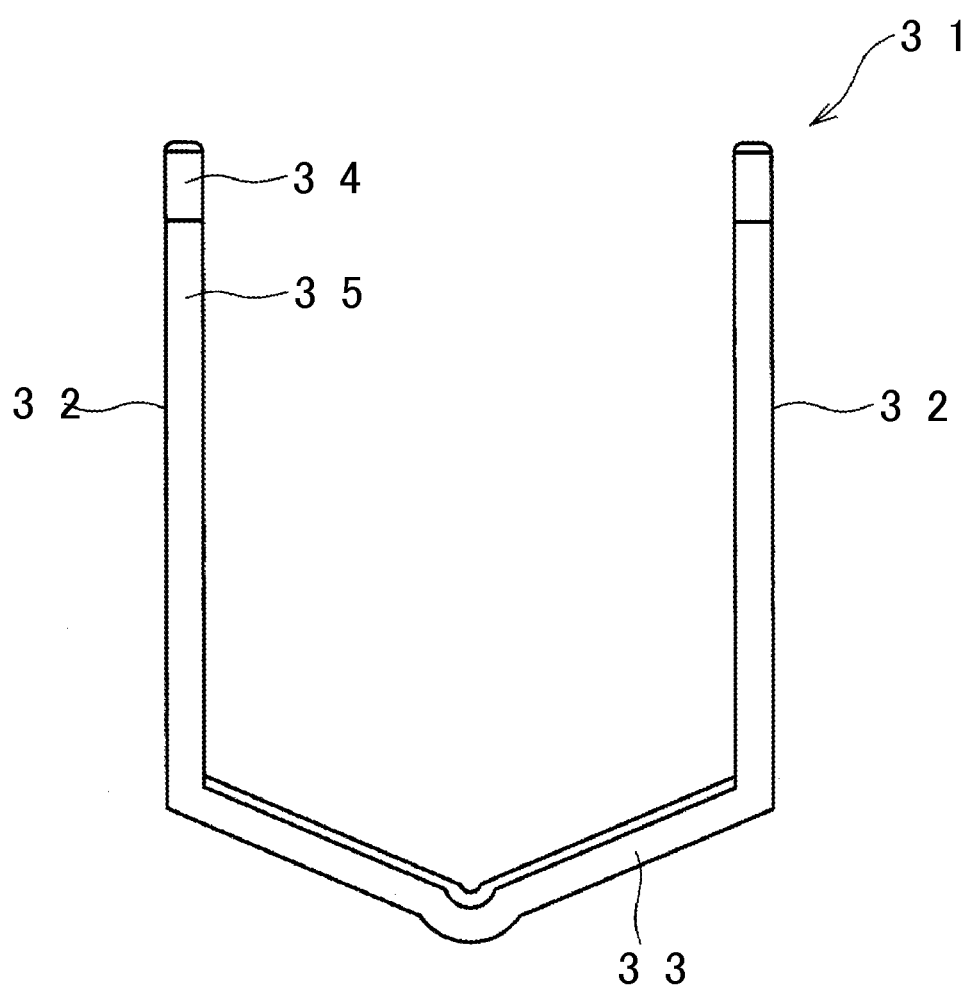
FIG. 3 is a view illustrating a conductor segment constituting a segment coil included in the stator of FIG. 1 in a state where the conductor segment has not been attached to the stator core yet.

FIG. 1 is a perspective view illustrating a rotary electric machine stator 10 of the present embodiment. FIG. 2 is a sectional view taken along a line A-A in FIG. 1. FIG. 3 is a view illustrating a conductor segment 31 constituting a segment coil 30 included in a rotary electric machine stator 10 in a state where the conductor segment 31 has not been attached to a stator core 12 yet. Hereinafter, the rotary electric machine stator 10 is just referred to as the stator 10.

The stator 10 includes a stator core 12, a stator cuff support 40, and connecting coil bodies 20u, 20v, 20w for three phases as a plurality of phases. The stator cuff support 40 is an example of the stator attachment. The connecting coil bodies 20u, 20v, 20w for three phases constitute a stator coil 20 as a three-phase coil assembly altogether. The stator core 12 is formed by laminating, in an axial direction, a plurality of electromagnetic steel sheets, which are discoid magnetic materials. The stator core 12 includes a toric yoke portion 13 and a plurality of stator teeth 14 projecting in a radial direction from a plurality of circumferential positions on an inner peripheral surface of the yoke portion 13. The stator core 12 includes a plurality of slots 15 each formed between stator teeth 14 adjacent to each other. The stator core 12 may be formed by pressing a magnetic powder, which is a magnetic material including a resin binder.

The stator cuff support 40 is placed on one axial end surface (an upper end surface in FIG. 1) of the stator core 12. The stator cuff support 40 may be placed on the both axial end surface of the stator core 12. FIG. 1 only partially illustrates the stator cuff support 40 by cutting the stator cuff support 40 at two places in a circumferential direction. FIG. 1 illustrates the stator 10 in a state where its central axis O is oriented along an up-down direction, which is different from an actual use state by 90 degrees. The stator cuff support 40 is used to assist a bending operation at the time when conductor segments 31 constituting the after-mentioned segment coil 30 are bent. The stator cuff support 40 will be described later in detail.

Figure 4:
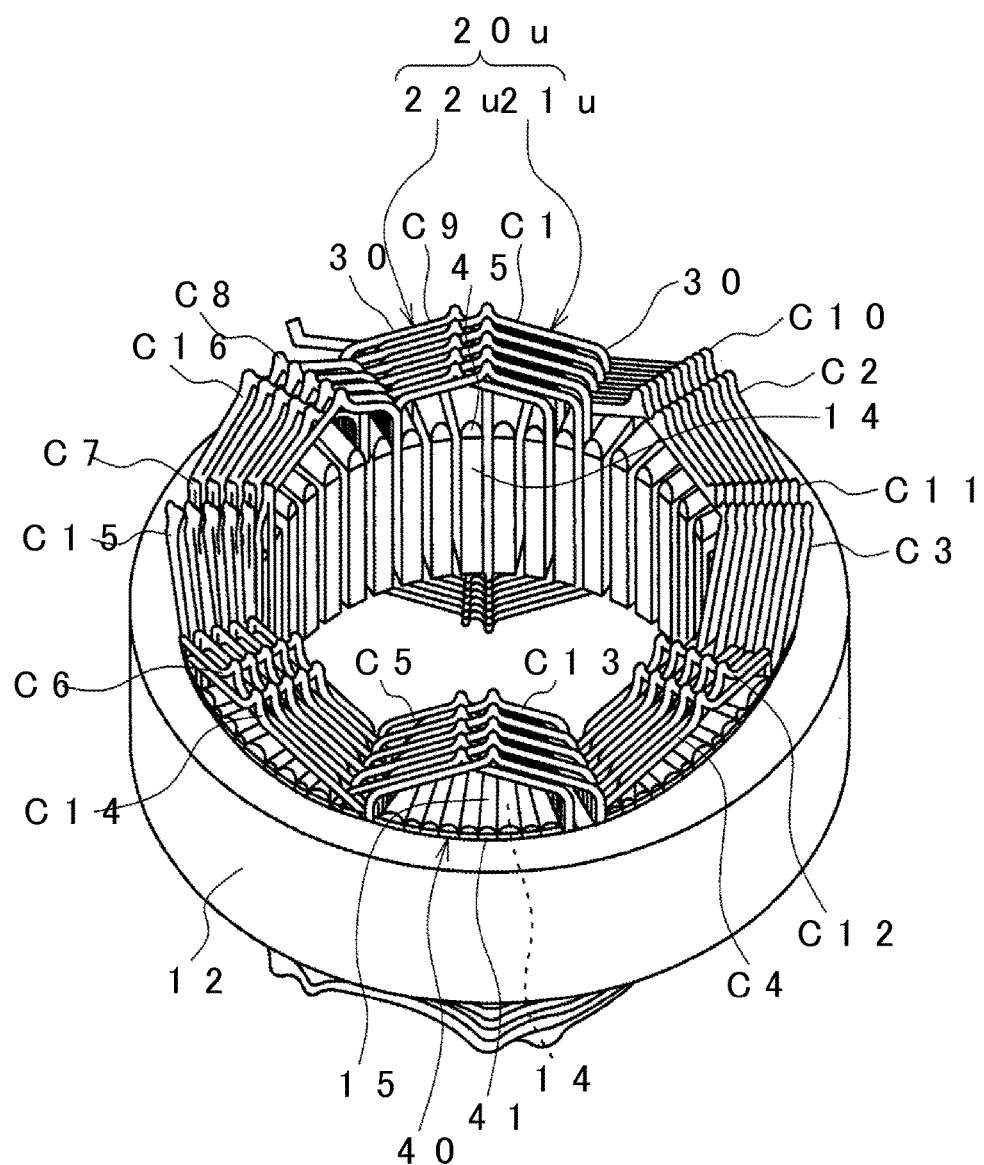
FIG. 4 is a perspective view illustrating the stator of FIG. 1 in a state where segment coils for one phase are attached to the stator core.
Figure 5:
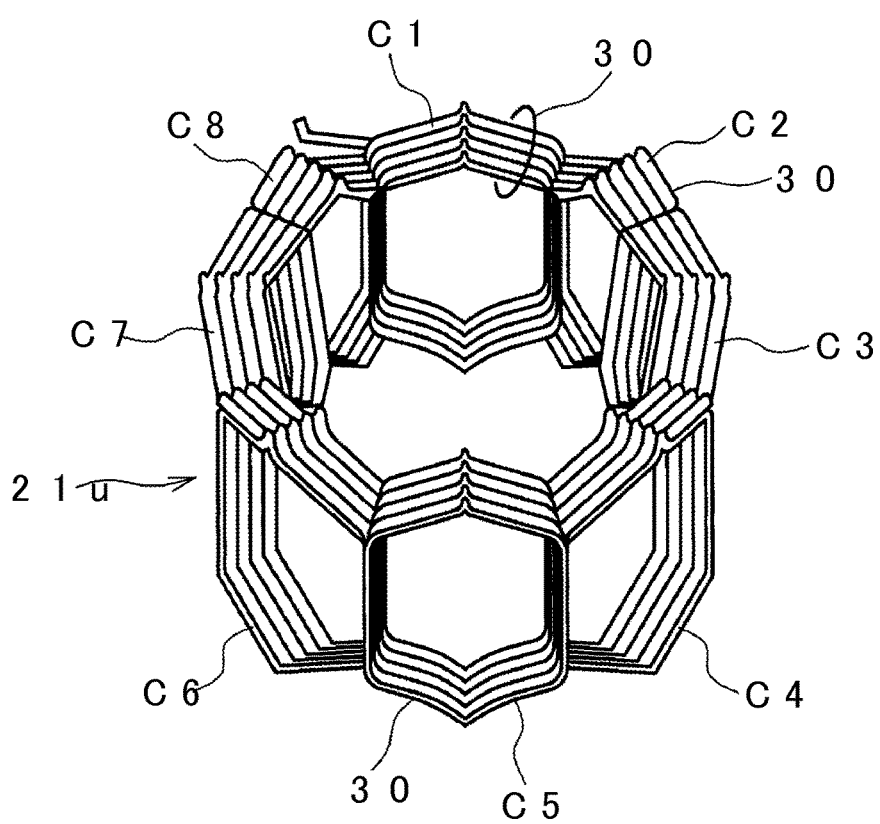
FIG. 5 is a perspective view illustrating a first coil element formed by the segment coils for one phase in the stator of FIG. 1.

The connecting coil bodies 20u, 20v, 20w for three phases are divided into a U-phase connecting coil body 20u, a V-phase connecting coil body 20v, and a W-phase connecting coil body 20w. First, the U-phase connecting coil body 20u is described. FIG. 4 is a perspective view illustrating a state where segment coils 30 for a U-phase are attached to the stator core 12. FIG. 5 is a perspective view illustrating a first U-phase coil element 21u formed by the U-phase segment coils 30 in the stator 10.

The U-phase connecting coil body 20u is constituted by the first U-phase coil element 21u on a power-line side, and a second U-phase coil element 22u on a neutral-point side. As will be described later, each of the U-phase coil elements 21u, 22u is formed by connecting a plurality of segment coils 30 (FIG. 5) in a toric shape. One end of the first U-phase coil element 21u is connected to a power line. The other end of the first U-phase coil element 21u is connected to one end of the second U-phase coil element 22u. The second U-phase coil element 22u has a shape similar to that of the first U-phase coil element 21u. The other end of the second U-phase coil element 22u is connected to a neutral-point bus bar (not shown) as a neutral point of the stator coil 20. One element coil constituting each of the U-phase coil elements 21u, 22u corresponds to one segment coil 30. Each segment coil 30 is formed by connecting the after-mentioned conductor segments 31 (FIG. 3) to each other in a radial direction.

As illustrated in FIGS. 4, 5, the first U-phase coil element 21u includes segment coils 30 respectively indicated by reference signs C1, C2 . . . C8. The second U-phase coil element 22u includes segment coils 30 respectively indicated by reference signs C9, C10 . . . C16. The segment coils 30 are configured such that C1, C2 . . . C16 are placed sequentially from a power-line connection side toward a neutral-point connection side. In each of the U-phase coil elements 21u, 22u, the plurality of segment coils 30 is placed at a plurality of positions in a circumferential direction of the stator core 12.

Each of the segment coils 30 includes a plurality of conductor segments 31 (FIG. 3). Each of the segment coils 30 is formed by connecting, by welding, one ends or the other ends of the plurality of conductor segments 31 to each other on one side of the stator core 12 in the axial direction (on an upper side in FIG. 4). Each of the segment coils 30 is wound around a plurality of stator teeth 14 in a state where part of the each of the segment coils 30 is inserted into two slots 15 separated from each other in the circumferential direction with a plurality of slots 15 being sandwiched therebetween in the stator core 12.

In a forming operation of each of the segment coils 30, a plurality of U-shaped conductor segments 31 illustrated in FIG. 3 is prepared first. Each of the conductor segments 31 includes two leg portions 32 parallel to each other, and a connection portion 33 formed in a mountain shape so as to connect one ends of the leg portions 32 to each other. Each of the conductor segments 31 includes a flat-square conductor element wire 34 having a rectangular section, and an insulation film 35 covering an intermediate part of the conductor element wire 34 in a lengthwise direction. The conductor element wire 34 is exposed from the insulation film 35 at both ends of the each of the conductor segments 31.

A plurality of conductor segments 31 are inserted into two slots 15 from the other side (a lower side in FIG. 4) of the stator core 12 in the axial direction in a state where the plurality of conductor segments 31 are aligned in the radial direction. Tip ends of the leg portions 32 (FIG. 3) projecting outward from one axial end surface (an upper end surface in FIG. 4) of the stator core 12 project. Then, parts of the leg portions 32 forming each of the segment coils 30 and provided on both sides thereof in the circumferential direction which parts project outward from the one axial end surface of the stator core 12 are bent so as to be inclined relative to the axial direction so that the parts of the leg portions 32 approach each other.

Further, a tip end of that part of the conductor segment 31 which is bent as such is further bent so as to extend outward in the axial direction. Axially extending tip ends of conductor segments 31 adjacent to each other in the radial direction and having the same phase, among the plurality of conductor segments 31, are joined by welding such as TIG welding so as to be connected to each other. Thus, those parts of the plurality of conductor segments 31 which are placed on an outer side relative to one axial end of the stator core 12 are bent and connected to each other. When the conductor segments 31 are bent, the after-mentioned stator cuff support 40 is used.

In each of the segment coils 30, leg portions 32 of two conductor segments 31 placed on both ends in the radial direction of the stator 10 are each bent toward another segment coil 30 adjacent thereto in the circumferential direction. In the segment coils 30 thus adjacent to each other, tip ends of leg portions 32 of two conductor segments 31 placed on a radial end are joined to each other by welding.

As illustrated in FIG. 5, the first U-phase coil element 21$u$ is formed in a toric shape by connecting respective ends of the plurality of segment coils 30 to each other. In FIG. 5, segment coils 30 adjacent to each other in the circumferential direction have opposite winding directions in terms of a current flowing direction. Similarly to the first U-phase coil element 21$u$, the second U-phase coil element 22$u$ (FIG. 4) is also formed in a toric shape by connecting ends of the plurality of segment coils 30. Leg portions 32 of respective segment coils 30 of the U-phase coil elements 21$u$, 22$u$ are inserted into a plurality of slots 15 such that they are shifted from each other just by one slot 15. Hereby, the U-phase coil elements 21$u$, 22$u$ are placed so as to be shifted from each other just by one slot 15 on one side in the circumferential direction in the stator core 12.

As illustrated in FIG. 4, the U-phase connecting coil body 20$u$ is formed by connecting, directly or via a bus bar (not shown) by welding, that segment coil 30 (C8 in FIGS. 4, 5) of the first U-phase coil element 21$u$ which is placed in one end in the circumferential direction to that segment coil 30 (C9 in FIG. 4) of the second U-phase coil element 22$u$ which is placed in the other end in the circumferential direction.

The V-phase connecting coil body 20$v$ and the W-phase connecting coil body 20$w$ (FIG. 1) are also configured in the same manner as the U-phase connecting coil body 20$u$. The V-phase connecting coil body 20$v$ is shifted from the U-phase connecting coil body 20$u$ toward one side in the circumferential direction just by two slots 15, and the V-phase connecting coil body 20$v$ is wound around a plurality of stator teeth 14. The W-phase connecting coil body 20$w$ is further shifted from the V-phase connecting coil body 20$v$ toward the one side in the circumferential direction just by two slots 15, and the W-phase connecting coil body 20$w$ is wound around a plurality of stator teeth 14. One end of each of the connecting coil bodies 20$u$, 20$v$, 20$w$ is formed so as to extend radially outside the stator 10, and is connected to a power line on a power-supply side (not shown). The other end of each of the connecting coil bodies 20$u$, 20$v$, 20$w$ is formed so as to extend radially outside the stator 10, and is connected to each other at a neutral-point bus bar (not shown).

The connecting coil bodies 20$u$, 20$v$, 20$w$ for such a plurality of phases form the stator coil 20. The stator coil 20 includes two coil ends 36, 37 projecting outward from both axial ends of the stator core 12. The stator coil 20 is fixed to the stator core 12 with varnish as will be described later.

Figure 6:
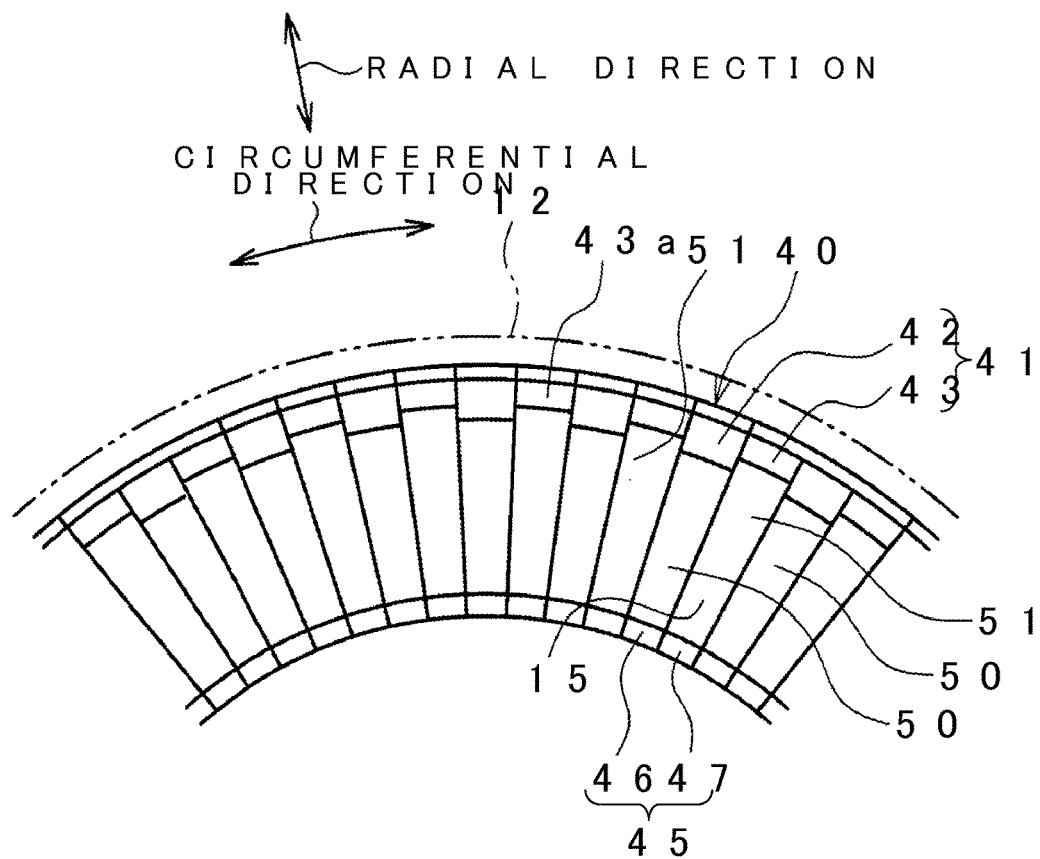
FIG. 6 is a view illustrating only part of a stator cuff support in a circumferential direction which stator cuff support is taken out from FIG. 1.
Figure 7:
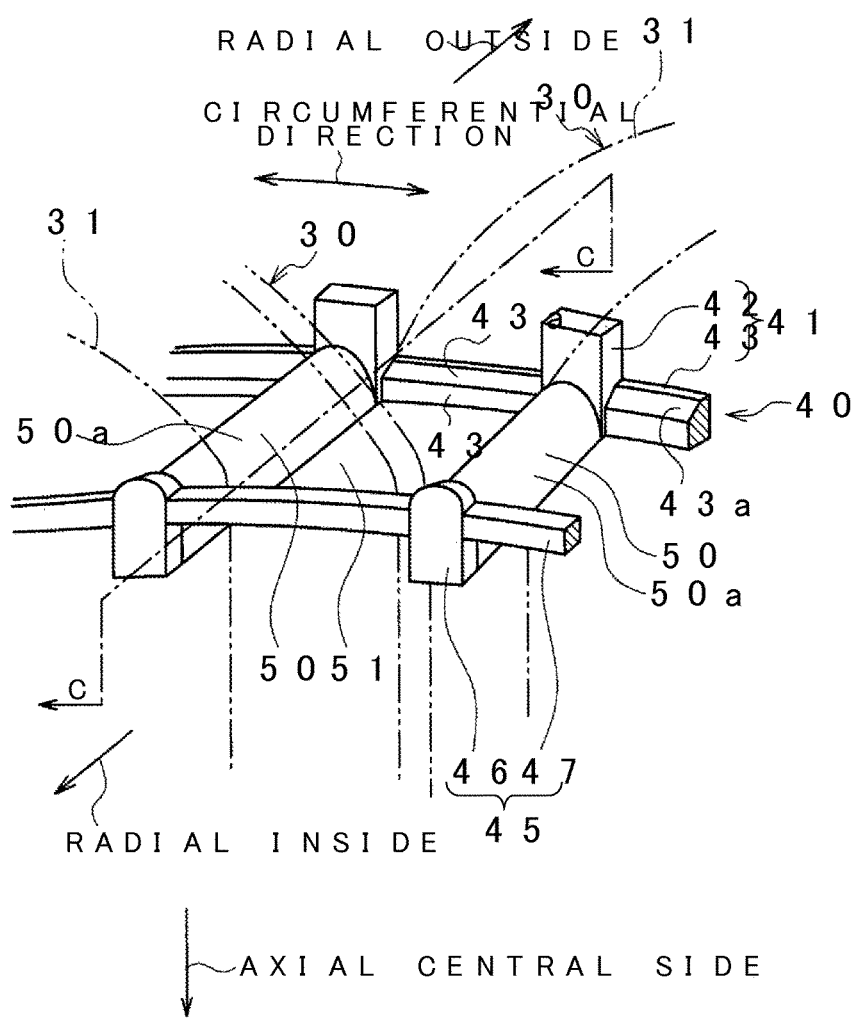
FIG. 7 is an enlarged perspective diagram of that part of the stator cuff support in the circumferential direction which is illustrated in FIG. 6.

Next will be described the stator cuff support 40 by use of FIGS. 6, 7 with reference to FIG. 2. FIG. 6 is a view illustrating part of only the stator cuff support 40 in the circumferential direction which stator cuff support 40 is taken out from FIG. 1. FIG. 7 is an enlarged perspective diagram of that part of the stator cuff support 40 in the circumferential direction which is illustrated in FIG. 6. The stator cuff support 40 is nonmagnetic, and is formed of a resin material such as PPS.

The stator cuff support 40 includes an outer annular portion 41, an inner annular portion 45, a plurality of cuff support teeth 50 (FIGS. 6, 7) and a plurality of cuff support slots 51 as holes. The outer annular portion 41 is formed in a toric shape. The outer annular portion 41 is formed such that a plurality of teeth outside placement portions 42 having a square columnar shape, and a plurality of outer connection portions 43 having an axial height shorter than the teeth outside placement portions 42 are placed alternately in the circumferential direction so as to be connected to each other. FIG. 7 illustrates a section of the outer annular portion 41 by cutting a right side thereof. FIG. 7 also illustrates a section of the after-mentioned inner annular portion 45 by cutting a right side thereof. The plurality of teeth outside placement portions 42 is placed on the same positions as the plurality of stator teeth 14 in terms of the circumferential direction, on a surface of an upper side of the yoke portion 13 of the stator core 12. Note that the "upper side" in the present specification indicates an upper side in a state where constituents of the stator 10 are placed, in a case where varnish is dropped from above the stator core 12 as will be described later. The plurality of outer connection portions 43 is placed at the same positions as the plurality of slots 15 of the stator core 12 in terms of the circumferential direction, on the surface of the upper side of the yoke portion 13.

The inner annular portion 45 is formed in a toric shape having the central axis same as the outer annular portion 41, and is placed radially inside the outer annular portion 41. The inner annular portion 45 is formed such that a plurality of teeth inside placement portions 46 each having a square columnar shape and configured such that both circumferential ends of an upper end thereof is chamfered so that the upper end has an arc shape when viewed in the radial direction, and a plurality of inner connection portions 47 are placed alternately in the circumferential direction so as to be connected to each other. The plurality of teeth inside placement portions 46 is placed on surfaces of upper sides of radially inner ends of the plurality of stator teeth 14 in the stator core 12. The plurality of inner connection portions 47 is placed at the same positions as the plurality of slots 15 of the stator core 12 in terms of the circumferential direction.

The cuff support teeth 50 (FIGS. 6, 7) radially connect inner peripheral surfaces of the teeth outside placement portions 42 of the outer annular portion 41 to outer peripheral surfaces of the teeth inside placement portions 46 of the inner annular portion 45. The cuff support teeth 50 are basically provided in all respective spaces between the teeth outside placement portions 42 and the teeth inside placement portions 46. Each of the plurality of cuff support slots 51 is formed in a rectangular shape surrounded by the outer annular portion 41, the inner annular portion 45, and two cuff support teeth 50 adjacent to each other in the circumferential direction. Each of the cuff support slots 51 is formed at a position corresponding to each of the slots 15 of the stator core 12, so as to communicate with an axial open end of the each of the slots 15. That is, upper openings of the slots 15 are mostly maintained.

Figure 8:
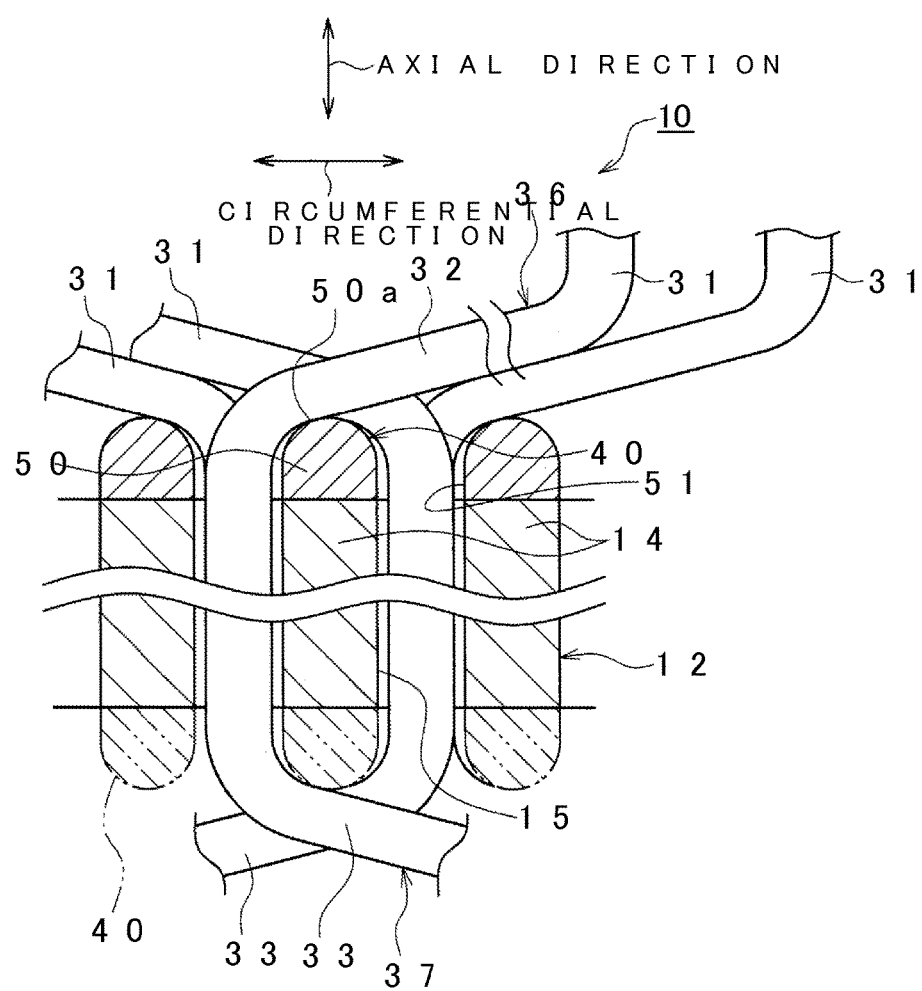
FIG. 8 is a sectional view taken along a line B-B in FIG. 2.

FIG. 8 is a sectional view taken along a line B-B in FIG. 2. The plurality of cuff support teeth 50 is placed on respective top faces of the plurality of stator teeth 14 of the stator core 12 such that they extend to cover the respective top faces. Each of the cuff support teeth 50 has, on an axially outer end (an upper end), a curved portion 50a that is curved in a mountain shape. That is, each of the cuff support teeth 50 is formed in a semicylindrical shape when viewed in the radial direction.

The leg portion 32 of the conductor segment 31 constituting the segment coil 30 is bent by making contact with the curved portion 50a of each of the cuff support teeth 50 at the time of manufacturing the stator 10. The stator cuff support 40 configured as such regulates a position of a bent portion at the time of bending the conductor segment 31, so that an axial height of the coil end 36, which is one of two coil ends 36, 37, is regulated to a desired value with accuracy.

Further, as illustrated in FIGS. 2, 7, a varnish guide face 43a, which is a tapered surface inclined downward, is formed on a top face of each of the outer connection portions 43 of the outer annular portion 41. More particularly, the varnish guide face 43a is placed on radially inner side in the top face of each of the outer connection portions 43. The varnish guide face 43a is formed on the axially outer end surface of the each of the outer connection portions 43 so as to approach an axially central side from an outer side toward an inner side in the radial direction. In other words, a height of a radially outer end of the varnish guide face is higher than a height of a radially inner end of the varnish guide face. The height is a length in the axial outside direction from the one axial end surface of the stator core 12. More specifically, the varnish guide face 43a is formed on the axially outer end surface of the each of the outer connection portions 43 so as to be inclined to the axially central side from the outer side toward the inner side in the radial direction. That is, in a section of the outer connection portion 43 along the radial direction, a corner in radially inner side of a square-shaped top face (an axially outer end surface) is removed so that the varnish guide face 43a is formed.

A radial outside of each of the outer connection portions 43 is opposite to the cuff support slot 51. A radial inside of each of the outer connection portions 43 is a cuff-support-slot-51 side. Accordingly, the varnish guide face 43a is formed at the same position in the circumferential direction as each of the slots 15 (FIG. 2) of the stator core 12, on the axially outer end surface of the outer annular portion 41. When varnish is dropped from above the stator core 12 and the stator coil 20, the varnish is guided to above the slots 15 by such varnish guide faces 43a, thereby making it possible to supply more varnish to necessary parts. The varnish guide face 43a may be formed on the whole axially outer end surface of each of the outer connection portions 43. A formation position of the varnish guide face 43a on the outer connection portion 43 is not limited, but it is preferable that the varnish guide face 43a be formed in a part including a radially inner half of the outer connection portion 43.

Further, at the time of manufacturing the stator 10, a plurality of U-shaped conductor segments 31 forming a plurality of segment coils 30 are inserted into two slots 15 from the other side (a lower side in FIG. 8) of the stator core 12 in the axial direction at the same time. In each of the conductor segments 31 constituting the segment coil 30, the leg portions 32 projecting outward from one axial end surface of the stator core 12 are bent in an inclined manner in the axial direction so as to approach each other. In this insertion operation, respective leg portions 32 of the same-phase segment coils 30 provided adjacent to each other in the circumferential direction and connected to each other are inserted into each of the slots 15 alternately in the radial direction. As illustrated in FIG. 8, the conductor segments 31 projecting from the one axial end surface (the upper end surface of FIG. 8) of the stator core 12 are provided alternately in the radial direction, and are bent so as to be inclined in opposite directions along the circumferential direction At the time of bending the conductor segment 31, the leg portion 32 of the conductor segment 31 is bent by making contact with a top face of the curved portion 50a of each of the cuff support teeth 50. At the time of bending the leg portion 32, the leg portion 32 is bent so as to be twisted toward one side in the circumferential direction or the other side in the circumferential direction by a rotational jig (not shown) placed on the upper side, in FIG. 8, relative to one axial end of the stator core 12. The rotational jig includes a first rotating element for twisting the leg portions 32 toward the one side in the circumferential direction, and a second rotating element for twisting the leg portions 32 toward the other side in the circumferential direction. The rotational jig is placed rotatably so that two rotating elements have the same central axis. In a state where tip ends of respective leg portions 32 are inserted into holes of respective rotating elements, the respective rotating elements are rotated so as to twist the respective leg portions 32.

Then, respective tip ends of the leg portions 32 having the same phase and placed adjacent to each other in the radial direction are joined by welding. Thus, the plurality of conductor segments 31 is bent outside the one axial end of the stator core 12 so as to be connected to each other, thereby forming the segment coil 30. Subsequently, a plurality of segment coils 30 is connected so as to form the stator coil 20.

Figure 9:
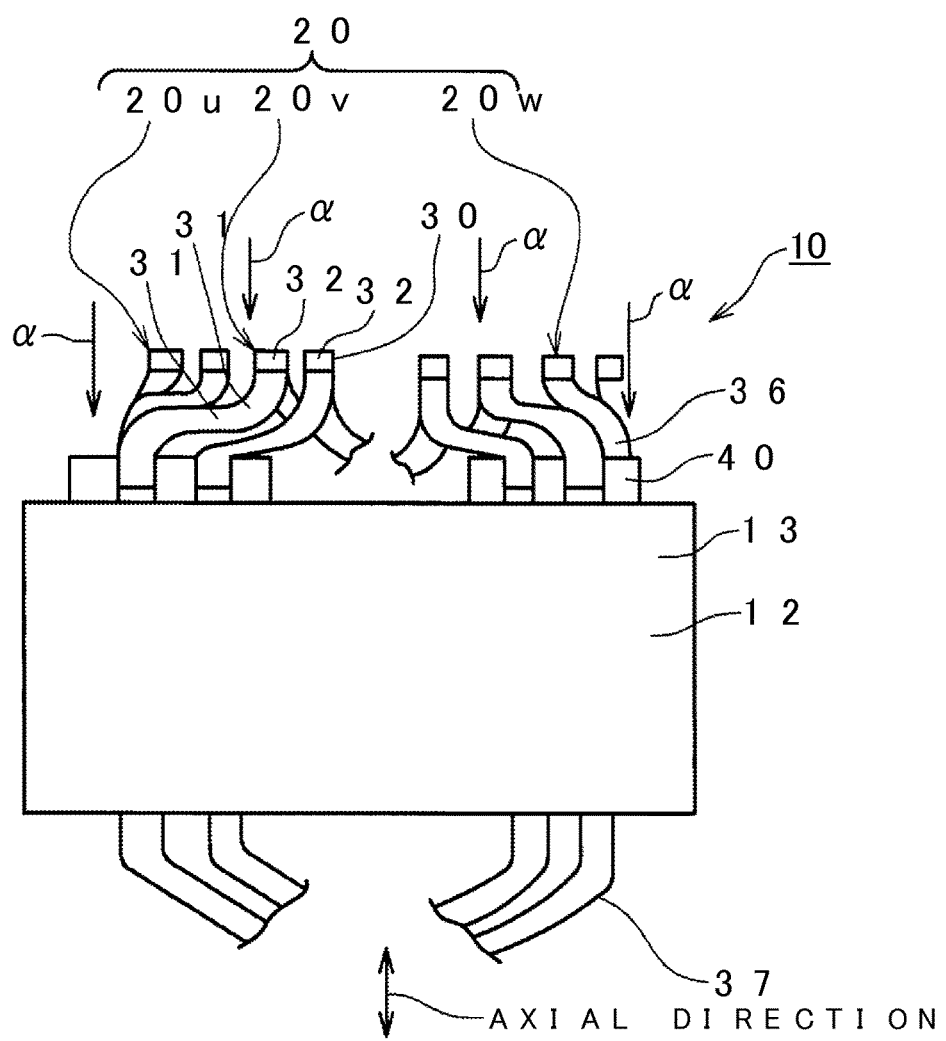
FIG. 9 is a view illustrating a position where varnish is dropped at the time of manufacturing the stator in the embodiment of the present invention, when viewed from a radial direction.
Figure 10:
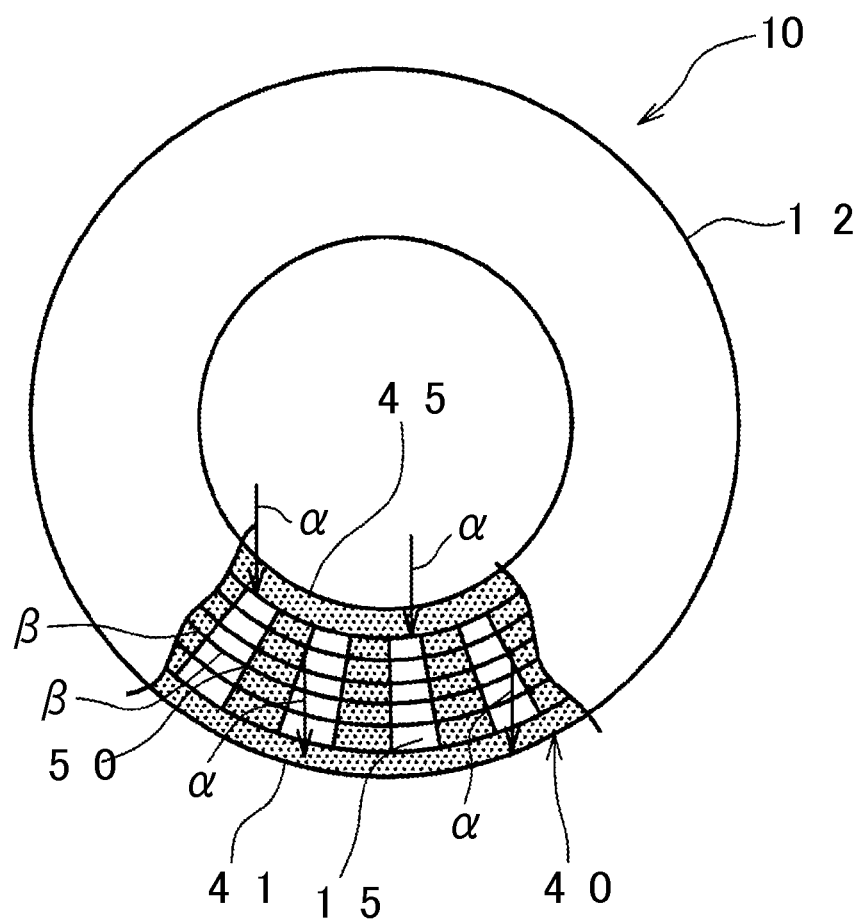
FIG. 10 is a view illustrating the position where the varnish is dropped at the time of manufacturing the stator in the embodiment of the present invention, when viewed from one side in an axial direction.

Further, the stator coil 20 is fixed to the stator core 12 with varnish. As illustrated in FIG. 9, in order to fix the stator coil 20 to the stator core 12, the stator core 12 is placed so that its axial direction is along the up-down direction and the coil end 36, which is one of two coil ends 36, 37, is placed on the upper side. In this state, the varnish is dropped from above. At this time, as indicated by arrows α in FIGS. 9, 10, the varnish is dropped from above a plurality of circumferential positions of the outer annular portion 41 and the inner annular portion 45 of the stator cuff support 40. In FIG. 10, the segment coil 30 is schematically illustrated by a plurality of curved lines β.

By dropping the varnish as such, one axial side of the stator coil 20 is impregnated with the varnish. After that, the stator core 12 is placed upside down, and then, varnish is dropped from above in the same manner in a state where the other coil end 37 is placed on the upper side. Hereby, the other axial side of the stator coil 20 is impregnated with the varnish. In the present embodiment, the varnish guide faces 43a (FIGS. 2, 7) are formed on the axially outer end surface of the stator cuff support 40 placed on one axial end surface of the stator core 12. This makes it possible to supply more varnish to that part of the stator coil 20 which is placed near the stator core 12 as will be described later.

Then, the varnish is hardened by keeping the stator coil 20 warm in a thermostat (not shown). Hereby, the stator coil 20 and the stator cuff support 40 are fixed to the stator core 12 with the varnish, thereby forming the stator 10.

According to the stator 10 of the present embodiment, when varnish is dropped to the stator coil 20 as illustrated in FIG. 2, the varnish that reaches the axially outer end surface of each of the outer connection portions 43 of the stator cuff support 40, as indicated by an arrow γ, is guided by the varnish guide face 43a. Then, the varnish thus guided by the varnish guide face 43a easily flows inside each of the slots 15 as indicated by an arrow δ. This accordingly makes it possible to supply more varnish to that part of the stator coil 20 which is placed close to the stator core 12. Accordingly, it is possible to increase reliability of a connecting and fixing portion between the segment coil 30 and the stator core 12. Further, the varnish hardly flows to an unnecessary part outside the stator 10, thereby making it possible to achieve reduction of a used amount of the varnish. Further, it is possible to restrain the varnish from flowing outside the stator 10, which can skip a removal operation of the varnish or shorten a necessary time for the removal operation.

Further, since the stator cuff support 40 is fixed to the stator core 12, it is not necessary to use a movable cuff support as a manufacturing apparatus for the stator 10. This makes it possible to simplify the manufacturing apparatus for the stator 10. Further, the stator cuff support 40 is nonmagnetic, which does not cause adverse effects on characteristics of a magnetic flux to flow in the stator core 12. Further, since the stator cuff support 40 is made of a resin material, its hardness is lower than metallic materials such as steel. This can easily prevent damage of the insulation film even if the segment coils 30 make contact therewith. Note that, in the present embodiment, the stator cuff support 40 is placed only on the one axial end surface of the stator core 12. However, as indicated by an alternate long and two short dashes line part in FIG. 8, the stator cuff support 40 may be also placed on the other axial end surface of the stator core 12. The stator cuff support 40 placed on the other axial end surface of the stator core 12 is also formed in the same manner as the stator cuff support 40 placed on the one axial end surface. In this configuration, the segment coils 30 and the stator core 12 can be easily fixed, with varnish on the other-coil-end-37 side, by the varnish guide faces 43a (FIGS. 2, 7) of the stator cuff support 40.

Figure 11:
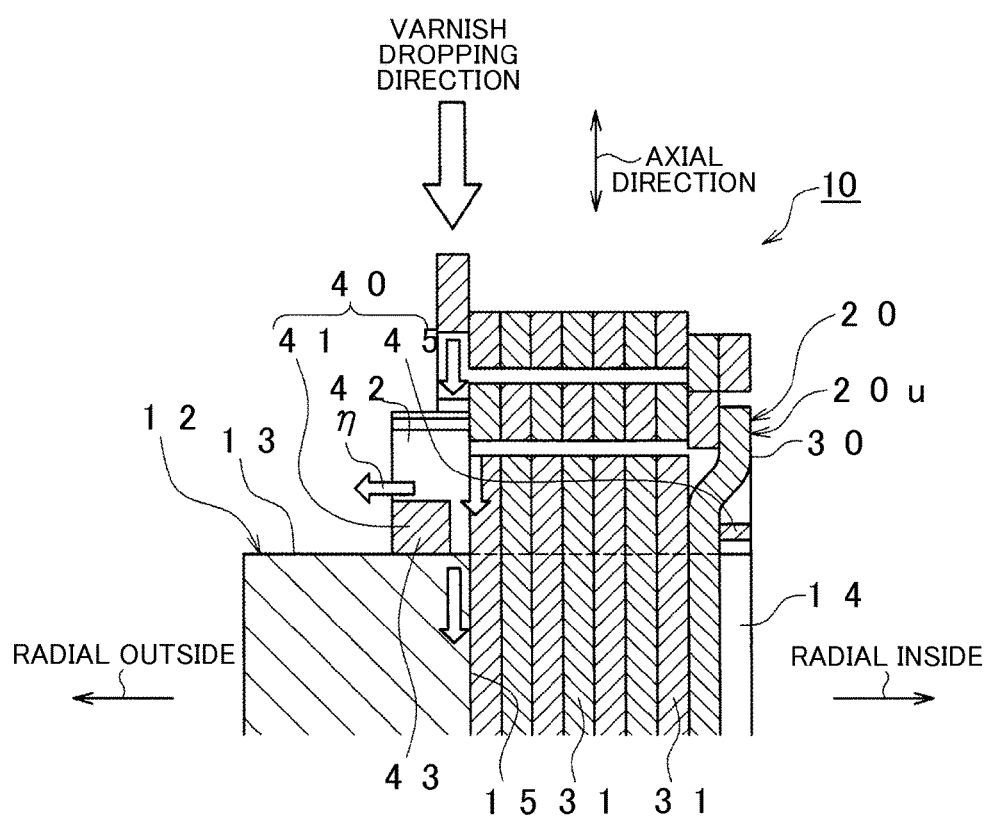
FIG. 11 is a view corresponding to FIG. 2 and illustrates a state where varnish is dropped at the time of manufacturing a stator in terms of a comparative example of the rotary electric machine stator.

FIG. 11 is a view corresponding to FIG. 2 and illustrates a state where varnish is dropped at the time of manufacturing a stator 10 in terms of a comparative example of the stator 10. The comparative example is different from the above embodiment in that an axially outer end surface (an upper end surface in FIG. 11) of each outer connection portion 43 of a stator cuff support 40 has a flat shape merely perpendicular to an axial direction.

In such a comparative example, when varnish is dropped to the stator cuff support 40 on a stator core 12, the varnish easily flows radially outwardly over each outer connection portion 43 of the stator cuff support 40 as indicated by an arrow η. Accordingly, an amount of the varnish to be supplied to that part of each of the segment coils 30 which is placed near the stator core 12 is reduced. In such a comparative example, there is room for improvement in terms of increasing reliability of a connecting and fixing portion between the segment coil 30 and the stator core 12. The present embodiment can prevent such inconvenience.

Figure 12:
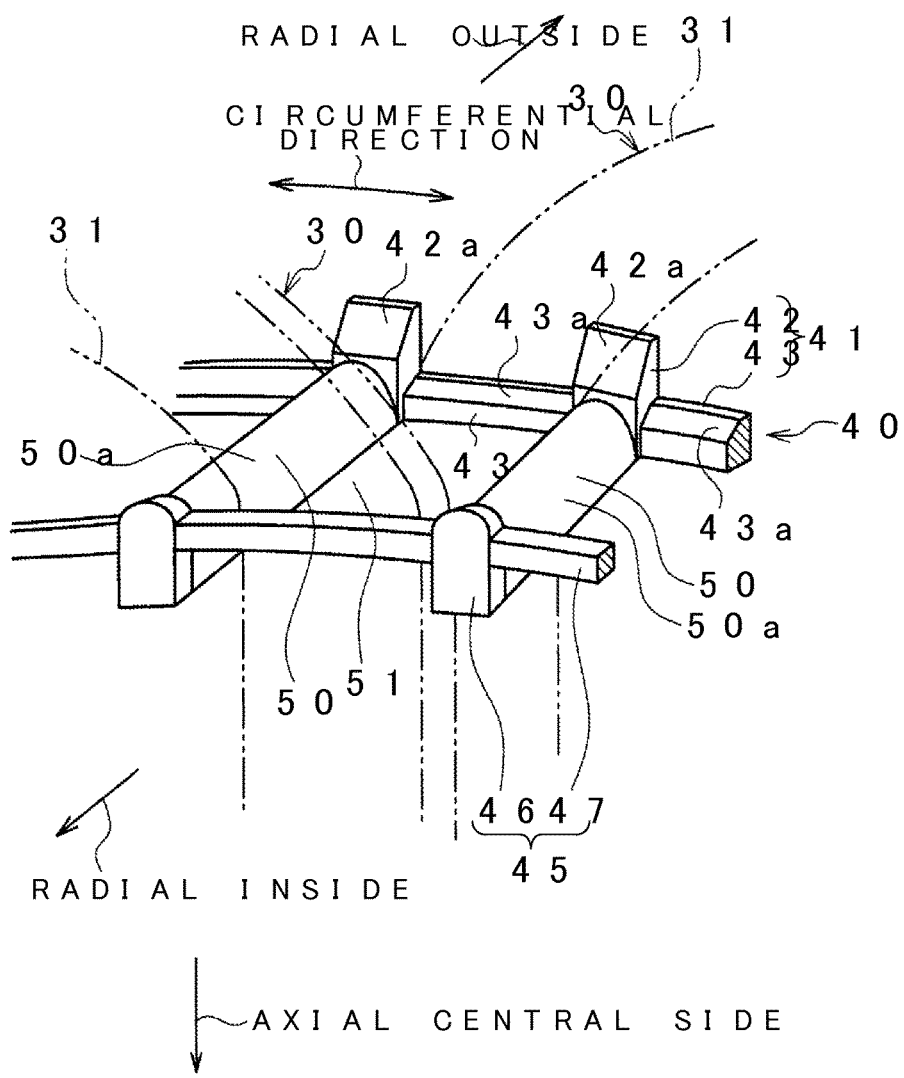
FIG. 12 is a view corresponding to FIG. 7 and illustrates a first example as another example of the embodiment of the present invention.

FIG. 12 is a view corresponding to FIG. 7 and illustrates a first example as another example of the embodiment of the present invention. In a configuration of this example, a stator cuff support 40 is configured such that an outer annular portion 41 includes a second varnish guide face 42a formed in that part of each teeth outside placement portion 42 which includes radially inner side of an axially outer end surface of the each teeth outside placement portion 42. Similarly to the varnish guide face 43a of each outer connection portion 43, the second varnish guide face 42a has a tapered surface formed so as to be inclined to an axially central side from radially outer side toward radially inner side. Hereby, the outer annular portion 41 is configured such that the varnish guide faces 43a and the second varnish guide faces 42a are formed alternately in the circumferential direction so as to be continued for an overall length in the circumferential direction. Each of the second varnish guide faces 42a may be formed on a whole axially outer end surface of each of the teeth outside placement portions 42. A formation position of the second varnish guide face 42a on the teeth outside placement portion 42 is not limited, but it is preferable that the second varnish guide face 42a be formed in a part including radially inner half of the teeth placement portion 42.

According to the above configuration, varnish that reaches the teeth outside placement portions 42 at the time of dropping the varnish is guided by the second varnish guide faces 42a. This accordingly allows the varnish to be easily supplied to those parts of axially outer sides of stator teeth 14 (see FIG. 2) on which a plurality of conductor segments 31 are placed. On this account, more varnish is easily supplied to those parts of the segment coils 30 which are placed near the stator core 12. Accordingly, it is possible to further increase reliability of connecting and fixing portions between the segment coils 30 and the stator core 12. Other configurations and effects are the same as in the configuration illustrated in FIGS. 1 to 10.

Note that, in the configuration of this example, the varnish guide face 43a may not be formed on the axially outer end surface of each of the outer connection portions 43, and the axially outer end surface may be formed merely in a flat shape perpendicular to the axial direction.

Figure 13:
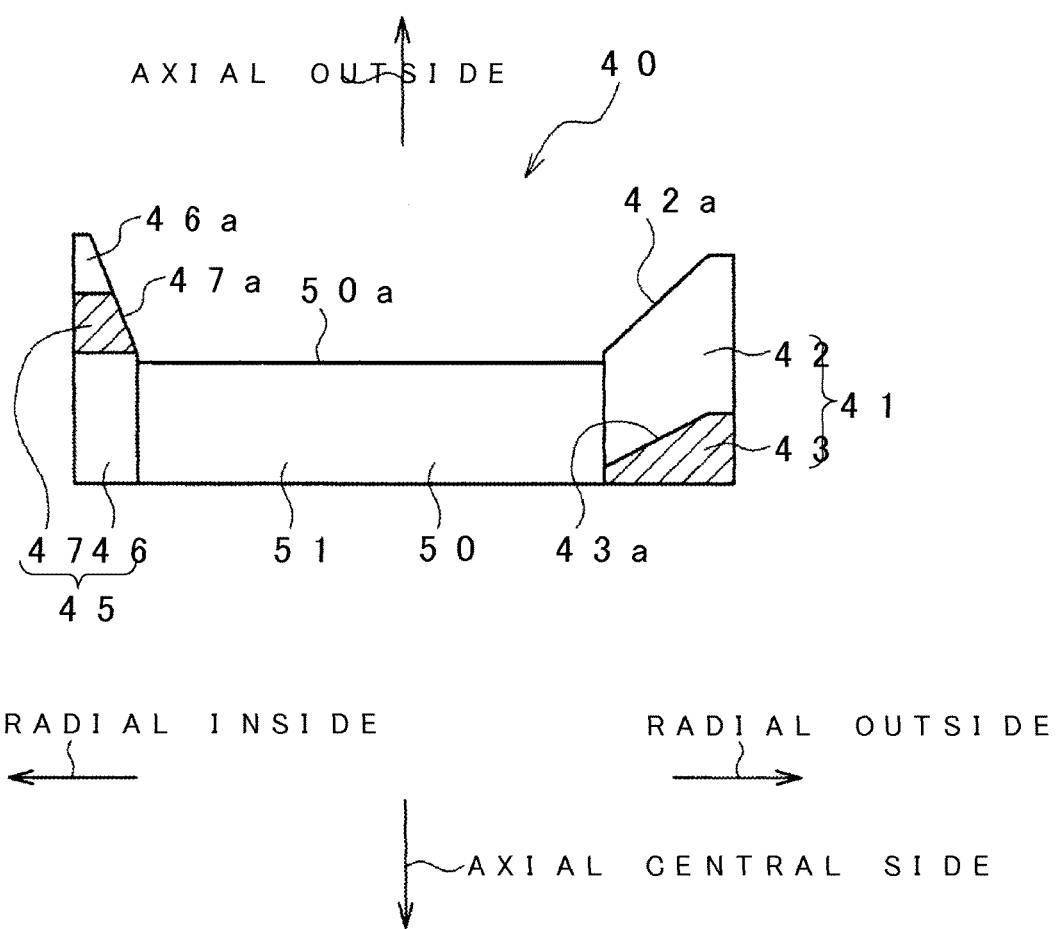
FIG. 13 is a view corresponding to a C-C section in FIG. 7 in terms of a second example as another example of the embodiment of the present invention.

FIG. 13 is a view corresponding to a C-C section in FIG. 7 in terms of a second example as another example of the embodiment of the present invention. In a configuration of this example, in addition to the configuration of the first example as another example illustrated in FIG. 12, a stator cuff support 40 includes an inner varnish guide face 47a and a second inner varnish guide face 46a formed in an inner annular portion 45. The inner varnish guide face 47a is formed in a part including a radially outer side of an axially outer end surface of each inner connection portion 47 of the inner annular portion 45.

The second inner varnish guide face 46a is formed in a radially outer side on an axially outer end surface of each teeth inside placement portion 46 of the inner annular portion 45. The inner varnish guide face 47a and the second inner varnish guide face 46a have a tapered surface formed so as to be inclined to an axially central side from the radially inner side toward the radially outer side. In other words, a height of radially inner end of the varnish guide face 46a or varnish guide face 47a is higher than a height of its radially outer end. The height is a length in the axial outside direction from the one axial end surface of the stator core 12. A radial inside of the inner annular portion 45 is an opposite side to a cuff-support-slot-51 side. A radial outside of the inner annular portion 45 is the cuff-support-slot-51 side. That is to say, that the radially outer end is located between the radially inner end and the cuff support slot 51. The inner varnish guide face 47a and the second inner varnish guide face 46a may be formed on whole axially outer end surfaces of each inner connection portion 47 and each teeth inside placement portion 46. Formation positions, in a radial direction of the inner annular portion 45, of the inner varnish guide face 47a and the second inner varnish guide face 46a are not limited, but it is preferable that the inner varnish guide face 47a and the second inner varnish guide face 46a be formed in respective parts including radially outer half of the inner connection portion 47 and the teeth inside placement portion 46, in terms of the radial direction of the inner annular portion 45.

According to the above configuration, varnish that reaches the inner connection portion 47 or the teeth inside placement portion 46 at the time of dropping the varnish is guided by the inner varnish guide face 47a or the second inner varnish guide face 46a. Hereby, the varnish is easily supplied to those parts of segment coils 30 which are placed near a stator core 12. Accordingly, it is possible to further increase reliability of connecting and fixing portions between the segment coils 30 and the stator core 12. Other configurations and effects are the same as in the configuration illustrated in FIGS. 1 to 10 or the configuration illustrated in FIG. 12.

Note that, in the configuration illustrated in FIG. 13, the inner annular portion 45 may be configured so as not to include either of the inner varnish guide face 47a and the second inner varnish guide face 46a. Further, in the configuration of each of the above examples, the varnish guide faces 43a or the second varnish guide faces 42a are formed on the outer annular portion 41. However, varnish guide faces may be formed only on the inner annular portion 45 out of the outer annular portion 41 and the inner annular portion 45.

Further, a radial thickness of the yoke portion 13 of the stator core 12 is relatively large, so a radial thickness of the outer annular portion 41 of the stator cuff support 40 can be made relatively large. In the meantime, the inner annular portion 45 is provided on that side of the stator cuff support 40 which is opposed to a rotor (not shown), so that the inner annular portion 45 may not be able to project toward the radially inside a radially inner end of the stator teeth 14. Further, in order to increase the number of conductor segments 31 to be inserted into the slot 15, a radial thickness of the inner annular portion 45 is restrained to be small. Further, since the inner annular portion 45 is placed on the radially inner side of the outer annular portion 41, a circumferential length of the inner annular portion 45 is smaller than a circumferential length of the outer annular portion 41. Accordingly, it is difficult to form a large tapered surface on the inner annular portion 45 in comparison with a case of the outer annular portion 41. On this account, in a case where the tapered surfaces are formed only on one of the outer annular portion 41 and the inner annular portion 45, it is effective to form the varnish guide faces 43a, 42a, which are the tapered surfaces, on the outer annular portion 41 like the configuration from FIGS. 1 to 10.

Note that each of the above examples deals with a case where the varnish guide face is a tapered surface. However, the varnish guide face may be any surfaces provided that the varnish guide face has a surface formed so as to approach the axially central side toward a cuff-support-slot-51 side in terms of the radial direction in the cuff support teeth. For example, the varnish guide face may be a curved surface which is formed so as to approach the axially central side toward the cuff support slot 51 in terms of the radial direction and which has an arc-shaped section to form a projection toward an outer side or a recess.

What is claimed is:

1. A stator for a rotary electric machine, the stator comprising:
    a stator core having:
        a yoke portion having a circular shape,
        stator teeth projecting in a radial direction from an inner peripheral surface of the yoke portion, and
        stator slots each defined between adjacent stator teeth;
    a stator attachment placed on an axial end surface of the stator core, the stator attachment including:
        an outer annular portion placed on the yoke portion, attachment teeth connected to the outer annular portion and placed on the stator teeth,
        an inner annular portion connected to radial inner ends of the attachment teeth,
        attachment slots each defined by the outer annular portion, the inner annular portion, and adjacent attachment teeth, the attachment slots each communicating with an axial open end of each of the stator slots, and
        varnish guide faces provided on the outer annular portion or the inner annular portion, the varnish guide faces that approach an axially central side toward an attachment slot side in the radial direction; and
    a plurality of segment coils each wound around the stator teeth, the segment coils being fixed to the stator core with varnish, the plurality of segment coils each including a plurality of conductor segments, the plurality of conductor segments being bent and connected to each other outside an axial end of the stator core, the conductor segments being bent by making contact with the attachment teeth, wherein
    a height of a first end of the each varnish guide face is higher than a height of a second end of the each varnish guide face,
    the second end is located between the first end and the attachment slot.

2. The stator according to claim 1, wherein
the varnish guide faces are first varnish guide faces,
the first varnish guide faces are provided on an axially outer end surface of the outer annular portion so as to be placed at same positions as the stator slots in a circumferential direction, and
the first varnish guide faces are inclined toward the axially central side in a direction from a radially outer side toward a radially inner side.

3. The stator according to claim 2, wherein
the outer annular portion includes second varnish guide faces,
the second varnish guide faces are provided on the axially outer end surface of the outer annular portion so as to be placed at same positions as the attachment teeth in the circumferential direction; and
the second varnish guide faces are inclined toward the axially central side in the direction from a radially outer side toward a radially inner side.

4. The stator according to claim 3, wherein
the first varnish guide faces and the second varnish guide faces are placed alternately in the circumferential direction so as to be continued for an overall length of the outer annular portion in the circumferential direction.

5. The stator according to claim 1, wherein
the varnish guide faces are provided on an axially outer end surface of the outer annular portion so as to be placed at same positions as the attachment teeth in a circumferential direction.

6. The stator according to claim 1, wherein
the varnish guide faces are provided in at least part of an axially outer end surface of the inner annular portion so as to be inclined toward the axially central side in a direction from a radially inner side toward a radially outer side.

* * * * *